(12) United States Patent
Gill

(10) Patent No.: US 7,180,715 B2
(45) Date of Patent: Feb. 20, 2007

(54) CANTED EASY AXIS IN SELF-PINNED LAYERS

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 477 days.

(21) Appl. No.: 10/788,688

(22) Filed: Feb. 26, 2004

(65) Prior Publication Data
US 2005/0190508 A1 Sep. 1, 2005

(51) Int. Cl.
*G11B 5/39* (2006.01)
(52) U.S. Cl. .............................................. 360/324.11
(58) Field of Classification Search ............ 360/324.11
See application file for complete search history.

(56) References Cited

U.S. PATENT DOCUMENTS

| 3,879,760 | A | * | 4/1975 | Lazzari ........................ 360/315 |
| 5,680,281 | A | | 10/1997 | Kung et al. ............... 360/327.2 |
| 6,324,037 | B1 | | 11/2001 | Zhu et al. ............... 360/324.12 |
| 6,594,124 | B2 | | 7/2003 | Zheng et al. ........... 360/324.12 |
| 2002/0182442 | A1 | * | 12/2002 | Ikeda et al. .................. 428/692 |
| 2003/0179512 | A1 | | 9/2003 | Ju et al. ................. 360/324.11 |

* cited by examiner

*Primary Examiner*—Julie Anne Watko
(74) *Attorney, Agent, or Firm*—Zilka-Kotab, PC

(57) ABSTRACT

A magnetic head having a free layer and an antiparallel (AP) pinned layer structure spaced apart from the free layer, the AP pinned layer structure including at least two AP-pinned layers having magnetic moments that are self-pinned antiparallel to each other, the AP-pinned layers being separated by an AP coupling layer. An easy axis of a first or both of the AP-pinned layers is oriented at an angle of at least 5° from the ABS along a plane of the first AP-pinned layer.

27 Claims, 10 Drawing Sheets

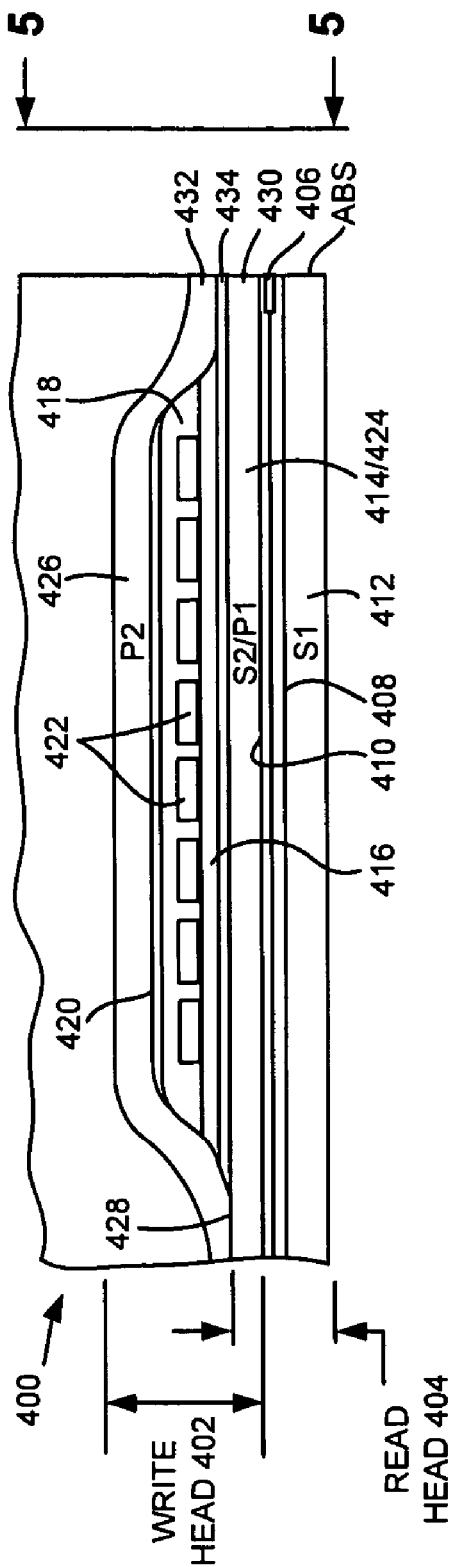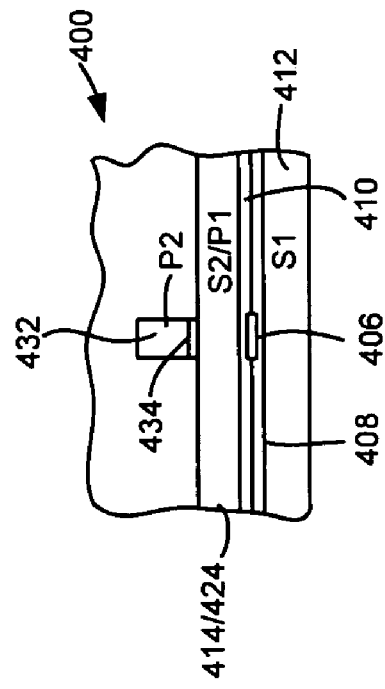

CANTED EASY AXIS IN SELF-PINNED LAYERS

FIELD OF THE INVENTION

The present invention relates to magnetic heads, and more particularly, this invention relates to antiparallel-pinned layers having a canted easy axis.

BACKGROUND OF THE INVENTION

The heart of a computer is a magnetic disk drive which includes a rotating magnetic disk, a slider that has read and write heads (also called writers and sensors), a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In high capacity disk drives, magnetoresistive (MR) read sensors, commonly referred to as MR heads, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization of the MR element, which in turn causes a change in resistance of the MR element and a corresponding change in the sensed current or voltage.

Another type of MR sensor is the giant magnetoresistance (GMR) sensor manifesting the GMR effect. In GMR sensors, the resistance of the GMR sensor varies as a function of the spin-dependent transmission of the conduction electrons between ferromagnetic layers separated by a non-magnetic layer (spacer) and the accompanying spin-dependent scattering which takes place at the interface of the ferromagnetic and non-magnetic layers and within the ferromagnetic layers.

GMR sensors using only two layers of ferromagnetic material (e.g., Ni—Fe) separated by a layer of non-magnetic material (e.g., copper) are generally referred to as spin valve (SV) sensors. In an SV sensor, one of the ferromagnetic layers, referred to as the pinned layer (reference layer), has its magnetization typically pinned by exchange coupling with an antiferromagnetic (e.g., NiO or Fe—Mn) layer. The pinning field generated by the antiferromagnetic layer should be greater than demagnetizing fields (about 200 Oe) at the operating temperature of the SV sensor (about 120° C.) to ensure that the magnetization direction of the pinned layer remains fixed during the application of external fields (e.g., fields from bits recorded on the disk). The magnetization of the other ferromagnetic layer, referred to as the free layer, however, is not fixed and is free to rotate in response to the field from the recorded magnetic medium (the signal field). U.S. Pat. No. 5,206,590 granted to Dieny et al., incorporated herein by reference, discloses a SV sensor operating on the basis of the GMR effect.

An exemplary high performance read head employs a spin valve sensor for sensing the magnetic signal fields from the rotating magnetic disk. FIG. 1A shows a prior art SV sensor 100 comprising a free layer (free ferromagnetic layer) 110 separated from a pinned layer (pinned ferromagnetic layer) 120 by a non-magnetic, electrically-conducting spacer layer 115. The magnetization of the pinned layer 120 is fixed by an antiferromagnetic (AFM) layer 130.

FIG. 1B shows another prior art SV sensor 150 with a flux keepered configuration. The SV sensor 150 is substantially identical to the SV sensor 100 shown in FIG. 1A except for the addition of a keeper layer 152 formed of ferromagnetic material separated from the free layer 110 by a non-magnetic spacer layer 154. The keeper layer 152 provides a flux closure path for the magnetic field from the pinned layer 120 resulting in reduced magnetostatic interaction of the pinned layer 120 with the free layer 110. U.S. Pat. No. 5,508,867 granted to Cain et al. discloses a SV sensor having a flux keepered configuration.

Another type of SV sensor is an antiparallel (AP)-pinned SV sensor. In AP-Pinned SV sensors, the pinned layer is a laminated structure of two ferromagnetic layers separated by a non-magnetic coupling layer such that the magnetizations of the two ferromagnetic layers are strongly coupled together antiferromagnetically in an antiparallel orientation. The AP-Pinned SV sensor provides improved exchange coupling of the antiferromagnetic (AFM) layer to the laminated pinned layer structure than is achieved with the pinned layer structure of the SV sensor of FIG. 1A. This improved exchange coupling increases the stability of the AP-Pinned SV sensor at high temperatures which allows the use of corrosion resistant antiferromagnetic materials such as NiO for the AFM layer.

Referring to FIG. 2A, an AP-Pinned SV sensor 200 comprises a free layer 210 separated from a laminated AP-pinned layer structure 220 by a nonmagnetic, electrically-conducting spacer layer 215. The magnetization of the laminated AP-pinned layer structure 220 is fixed by an AFM layer 230. The laminated AP-pinned layer structure 220 comprises a first ferromagnetic layer 226 and a second ferromagnetic layer 222 separated by an antiparallel coupling layer (APC) 224 of nonmagnetic material. The two ferromagnetic AP-pinned layers 226, 222 ($FM_1$ and $FM_2$) in the laminated AP-pinned layer structure 220 have their magnetization directions oriented antiparallel, as indicated by the arrows 227, 223 (arrows pointing out of and into the plane of the paper respectively).

A key requirement for optimal operation of an SV sensor is that the pinned layer should be magnetically saturated perpendicular to the air bearing surface. Lack of magnetic saturation in the pinned layer leads to reduced signal or dynamic range. Factors leading to a loss of saturation include demagnetizing fields at the edge of the pinned layer, magnetic fields from recorded data and from longitudinal biasing regions, current induced fields and the coupling field to the free layer.

Analysis of the magnetic state of pinned layers in small sensors (a few microns or less in width), reveals that due primarily to the presence of large demagnetizing fields at the sensor edges the magnetization is not uniform over the area of the pinned layer. FIG. 2B shows a perspective view of an SV sensor 250. The SV sensor 250 is formed of a sensor stripe 260 having a front edge 270 at the ABS and extending away from the ABS to a rear edge 272. Due to the large demagnetizing fields at the front edge 270 and the rear edge 272 of the sensor stripe 260, the desired perpendicular magnetization direction is achieved only at the center portion 280 of the pinned layer stripe, while the magnetization tends to be curled into a direction parallel to the ABS at the edges of the stripe. The extent of these curled regions is controlled by the magnetic stiffness of the pinned layer.

As mentioned above, prior art AP-Pinned SV sensors use an AFM in order to pin the magnetization of the AP-pinned layers so that the pinned layers do not move around when the head is reading data from the disk, upon application of external magnetic fields, etc. The AFM layers are typically very thick, on the order of 150–200 Å. Due to the large overall thickness, such sensors are typically not practical for use in applications where a thin head is desirable.

To reduce the width of sensors, the AP-pinned layer structure 220 can be "self-pinning," meaning that the magnetic orientations of the AP-pinned layers 222,226 are pinned antiparallel to each other without the need for an AFM for stabilization. When the sensor is fabricated, the magnetic easy axis of the AP-pinned layers 222,226 are purposefully oriented perpendicular to the ABS and parallel to the plane of the layers, as shown in FIG. 2A. Under certain stress conditions, self pinning is achieved by some sort of induced anisotropy which pins the magnetization of the layers perpendicular to the ABS. Anisotropy is purposefully induced by creating magnetostriction and compressive stress to obtain the desired magnetic orientations. FIGS. 2C and 2D illustrate the magnetic orientations (M1, M2) of the AP-pinned layers 222,226.

However, a problem has been found in such self-pinned AP-pinned layer structures. When the sensor is in use, the head containing the sensor can contact the disk. Such contact is usually caused by a defect (e.g., protrusion) on the disk surface, a physical impact of the system housing the disk drive, etc. During such a head-disk contact, the head experiences mechanical stress (tensile stress, etc.). The stress that the interaction generates can induce an anisotropy that reduces or cancels the initial anisotropy of the sensor. This is not permanent, but momentary. However, because the net anisotropy is very small for that moment, the magnetic orientations of the AP-pinned layers can "flip," resulting in a reverse orientation of the AP-pinned layer magnetizations. When the orientations flip, the sign of the output sensing voltage is reversed, resulting in read errors. Worse yet, the magnetic orientations of the AP-pinned layers can permanently freeze in the reverse positions, resulting in a useless head.

Elevated temperature can also reduce the anisotropy of the AP-pinned layer structure, resulting in a tendency of the magnetic orientations of the AP-pinned layers to flip.

What is needed is a self-pinned AP-Pinned SV sensor having increased stability and a consistent final state magnetic orientation of the AP-pinned layers.

SUMMARY OF THE INVENTION

The present invention provides a solution to the problem of magnetization flip in AP-pinned layers. Aside from the magnetostriction- and stress-induced anisotropy, the AP-pinned layers have an intrinsic anisotropy (e.g., 50–100 Oe depending on the material) that is independent of stress. In the present invention, the magnetic easy axes (intrinsic) of the AP-pinned layers are purposefully oriented at some angle away from the perpendicular. The angled easy axis is referred to herein as a "canted" easy axis.

When a stress event occurs, such as when the head hits a disk defect for example, the anisotropy from compressive stress becomes very small, as mentioned above. However, the intrinsic anisotropy is not changed by interaction of the head with the defect. At the moment that the anisotropy becomes very small (when the head hits the defect), the orientation of the pinned layer wants to change. Because the easy axis is canted, the intrinsic anisotropy controls the direction in which the magnetization will rotate. If the intrinsic anisotropy were perpendicular to the ABS, the magnetization could rotate clockwise or counterclockwise. In the present invention, the easy axis is canted, so upon application of an external stress, the orientation will always rotate towards the canted easy axis and become horizontal (parallel to the ABS). As soon as the head passes away from the defect, the anisotropy from intrinsic stress takes over and the magnetic moments of the AP-pinned layers want to rotate back towards the easy axis, and thus the original direction, causing them to return to the desired perpendicular orientation A magnetic head according to the present invention has a free layer and an antiparallel (AP) pinned layer structure spaced apart from the free layer, the AP pinned layer structure including at least two AP-pinned layers having magnetic moments that are self-pinned antiparallel to each other, the AP-pinned layers being separated by an AP coupling layer. An easy axis of one or more of the AP-pinned layers is oriented at an angle of at least 5° from the ABS along a plane of the first AP-pinned layer.

In one embodiment, the easy axis of one or more of the AP-pinned layers is oriented at an angle of between about 30° and about 60° from the ABS along a plane of the associated AP-pinned layer. Preferably, the easy axis of each of the AP-pinned layers is oriented at an angle of between about 40° and about 50° from the ABS along a plane of the associated AP-pinned layer.

The angle of each of the easy axes can be about the same or can be different, and can be set by forming the AP-pinned layer(s) in the presence of an applied magnetic field having flux oriented at the desired angle from the ABS along the plane of the first AP-pinned layer.

Preferably, the AP pinned layer structure is self pinned, the AP pinned layer structure not being stabilized by an antiferromagnet.

The head described herein may form part of a GMR head, a CIP sensor, a CPP GMR sensor, a CPP tunnel valve sensor, etc. for use in a magnetic storage system.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a partial view of the slider and a merged magnetic head.

FIG. 5 is a partial ABS view, not to scale, of the slider taken along plane 5—5 of FIG. 4 to show the read and write elements of the merged magnetic head.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1A:
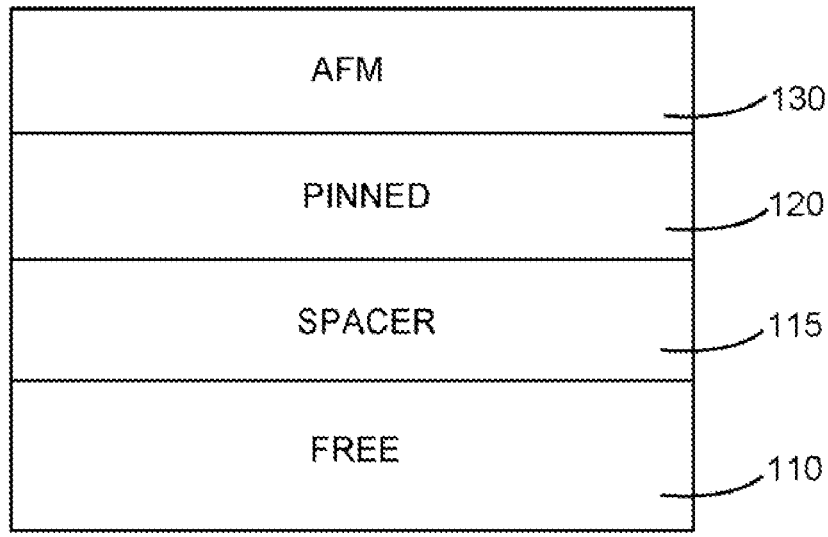
FIG. 1A is an air bearing surface view, not to scale, of a prior art spin valve (SV) sensor.
Figure 1B:
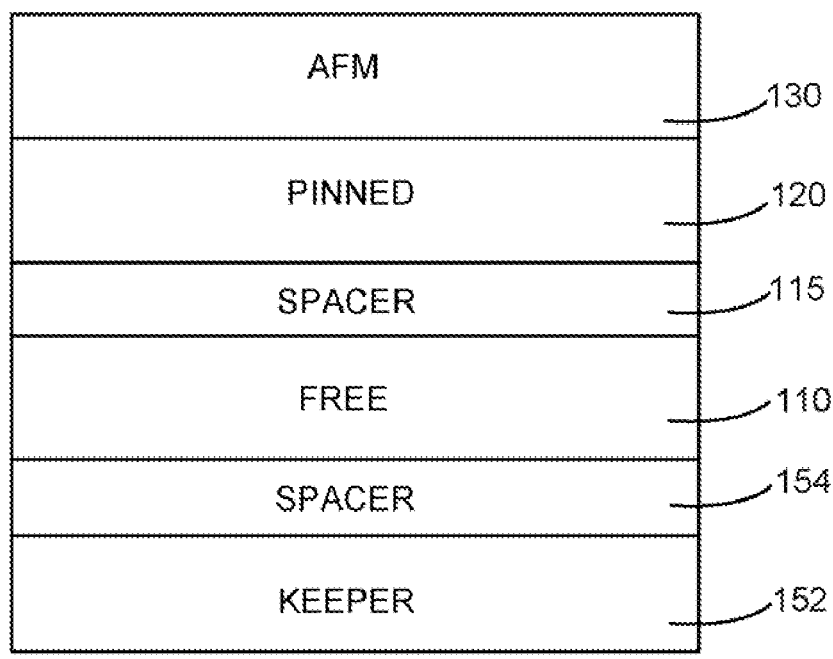
FIG. 1B is an air bearing surface view, not to scale, of a prior art keepered SV sensor.
Figure 2A:
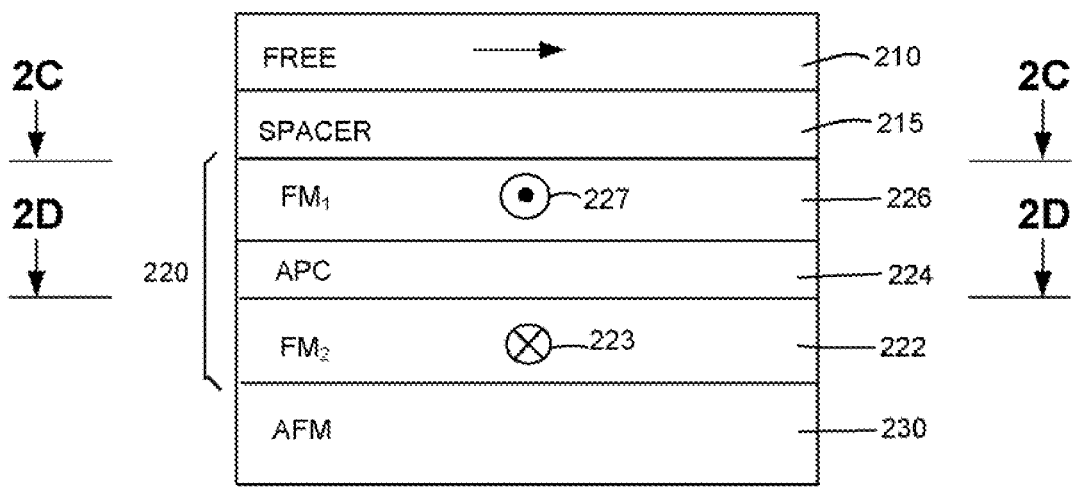
FIG. 2A is an air bearing surface view, not to scale, of a prior art AP-Pinned SV sensor.
Figure 2B:
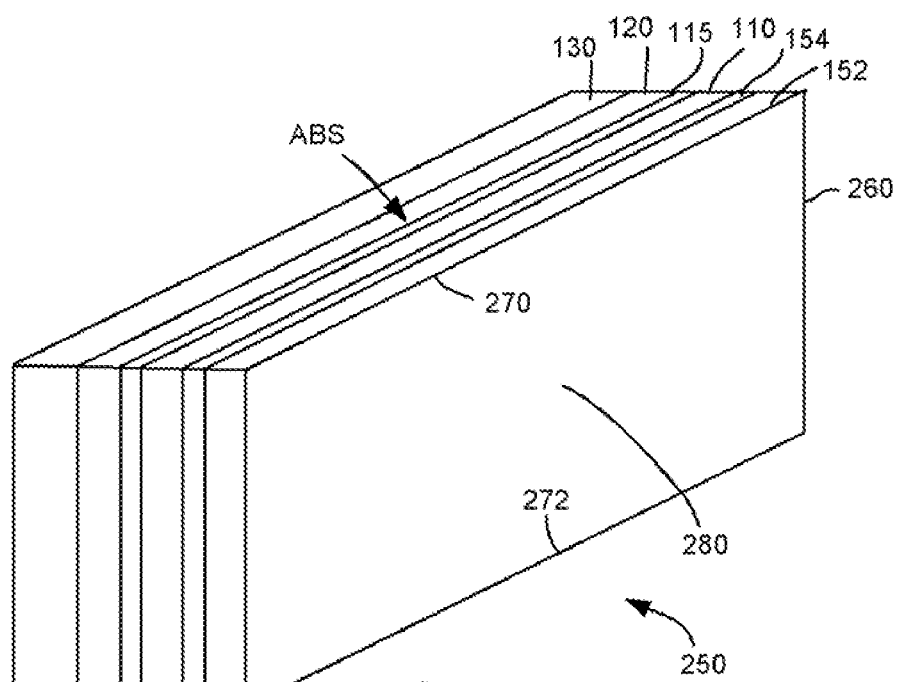
FIG. 2B is a perspective view, not to scale, of a prior art AP-Pinned SV sensor.
Figure 2C:
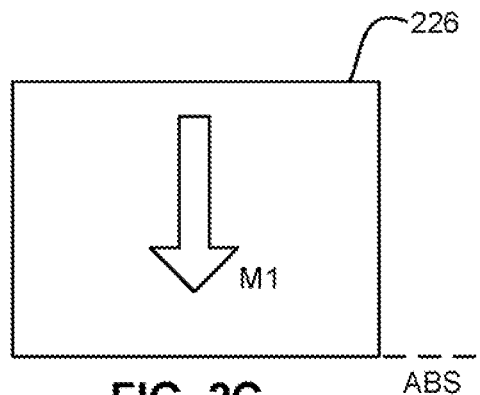
FIG. 2C is a partial top down view of the sensor shown in FIG. 2A taken along line 2C—2C of FIG. 2A.
Figure 2D:
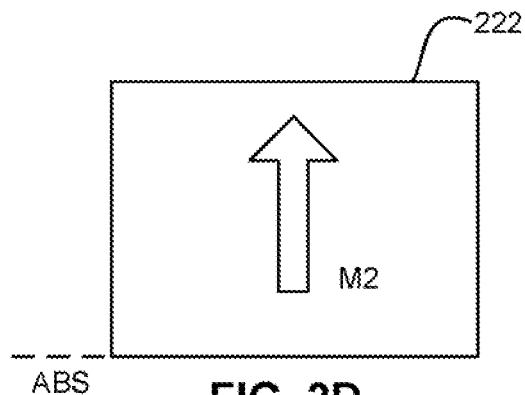
FIG. 2D is a partial top down view of the sensor shown in FIG. 2A taken along line 2D—2D of FIG. 2A.
Figure 3:
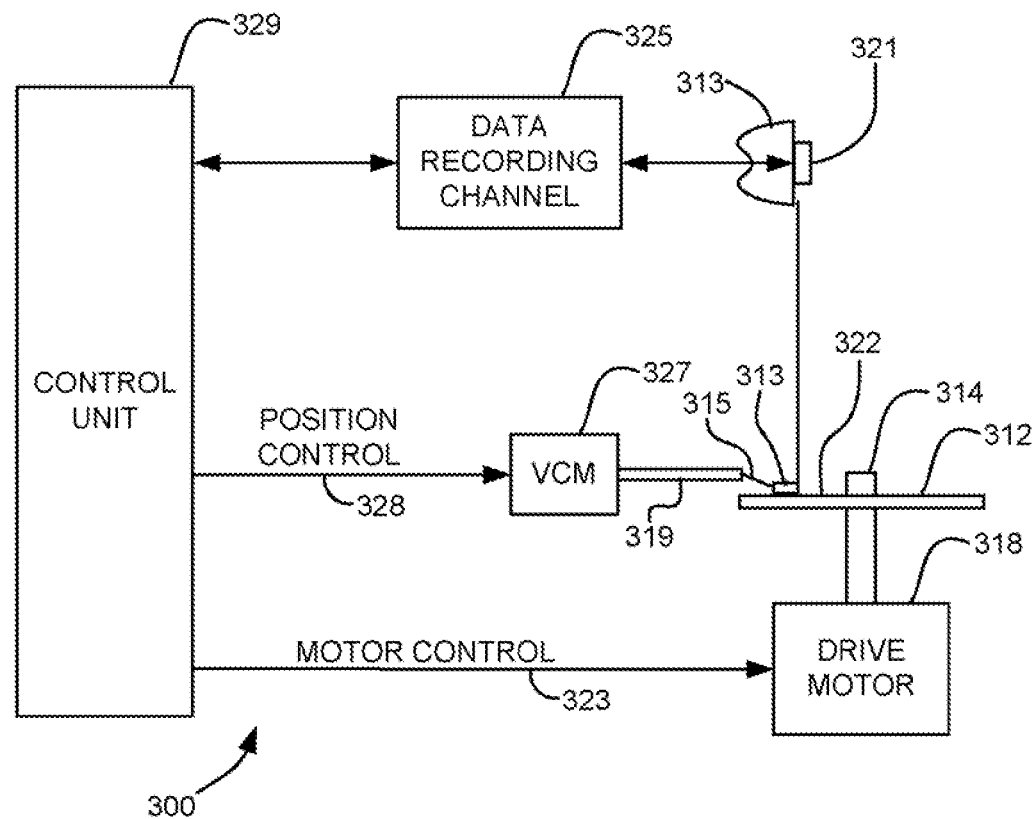
FIG. 3 is a simplified drawing of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by means way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

FIG. 4 is a side cross-sectional elevation view of a merged magnetic head 400, which includes a write head portion 402 and a read head portion 404, the read head portion employing a dual spin valve sensor 406 of the present invention. FIG. 5 is an ABS view of FIG. 4. The spin valve sensor 406 is sandwiched between nonmagnetic electrically insulative first and second read gap layers 408 and 410, and the read gap layers are sandwiched between ferromagnetic first and second shield layers 412 and 414. In response to external magnetic fields, the resistance of the spin valve sensor 406 changes. A sense current ($I_s$) conducted through the sensor causes these resistance changes to be manifested as potential changes. These potential changes are then processed as readback signals by the processing circuitry 329 shown in FIG. 3.

The write head portion 402 of the magnetic head 400 includes a coil layer 422 sandwiched between first and second insulation layers 416 and 418. A third insulation layer 420 may be employed for planarizing the head to eliminate ripples in the second insulation layer caused by the coil layer 422. The first, second and third insulation layers are referred to in the art as an "insulation stack". The coil layer 422 and the first, second and third insulation layers 416, 418 and 420 are sandwiched between first and second pole piece layers 424 and 426. The first and second pole piece layers 424 and 426 are magnetically coupled at a back gap 428 and have first and second pole tips 430 and 432 which are separated by a write gap layer 434 at the ABS. Since the second shield layer 414 and the first pole piece layer 424 are a common layer this head is known as a merged head. In a piggyback head an insulation layer is located between a second shield layer and a first pole piece layer. First and second solder connections (not shown) connect leads (not shown) from the spin valve sensor 406 to leads (not shown) on the slider 313 (FIG. 3), and third and fourth solder connections (not shown) connect leads (not shown) from the coil 422 to leads (not shown) on the suspension.

Figure 6:
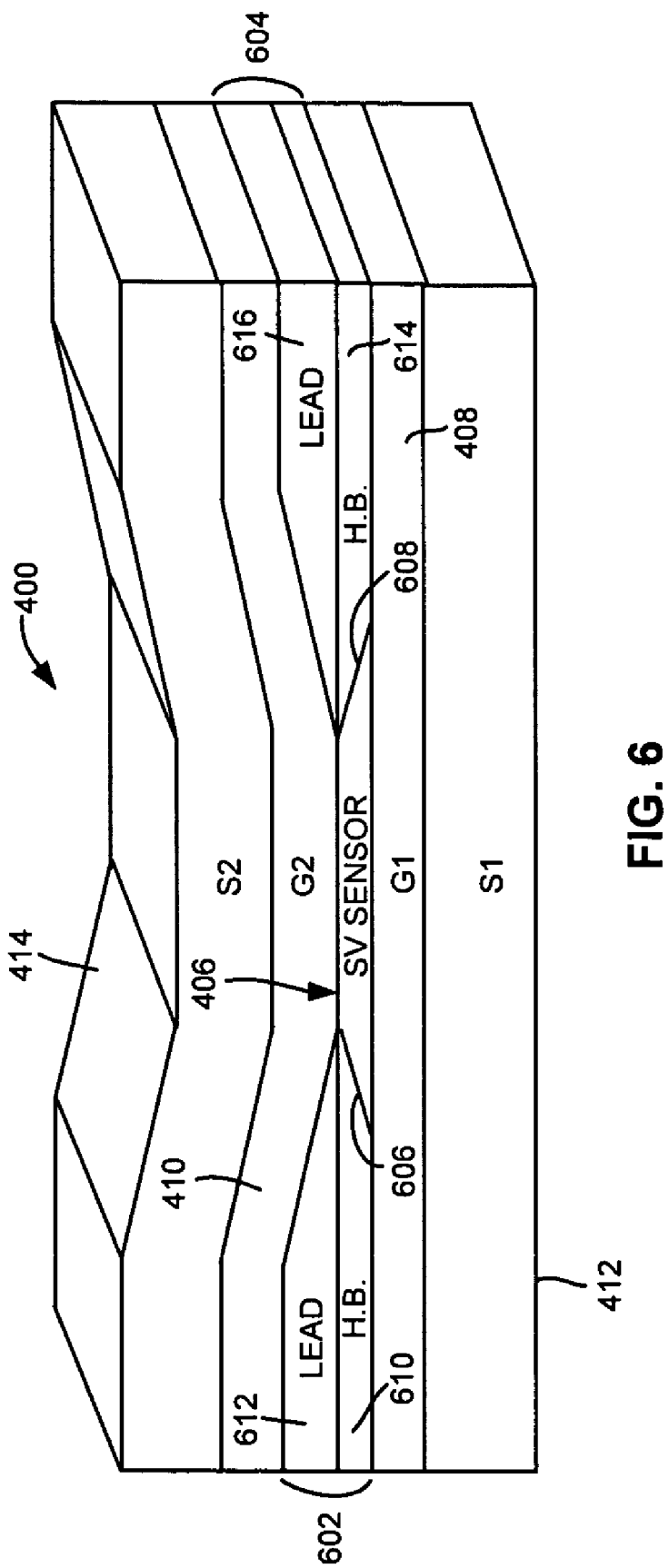
FIG. 6 is an enlarged isometric illustration, not to scale, of the read head with a spin valve sensor.

FIG. 6 is an enlarged isometric ABS illustration of the read head 400 shown in FIG. 4. The read head 400 includes the spin valve sensor 406. First and second hard bias and lead layers 602 and 604 are connected to first and second side edges 606 and 608 of the spin valve sensor. This connection is known in the art as a contiguous junction and is fully described in U.S. Pat. No. 5,018,037 which is incorporated by reference herein. The first hard bias and lead layers 602 include a first hard bias layer 610 and a first lead layer 612 and the second hard bias and lead layers 604 include a second hard bias layer 614 and a second lead layer 616. The hard bias layers 610 and 614 cause magnetic fields to extend longitudinally through the spin valve sensor 406 for stabilizing the magnetic domains therein. The spin valve sensor 406 and the first and second hard bias and lead layers 602 and 604 are located between the nonmagnetic electrically insulative first and second read gap layers 408 and 410. The first and second read gap layers 408 and 410 are, in turn, located between the ferromagnetic first and second shield layers 412 and 414.

The present invention provides a new self-pinned AP-Pinned SV sensor structure having increased stability and a consistent final state magnetic orientation of the AP-pinned layers. Many types of heads can use the structure described herein, and the structure is particularly adapted to a CPP GMR sensor, a CIP GMR sensor, and a CPP tunnel valve sensor. In the following description, the width of the layers (W) refers to the track width. The sensor height is in a direction into the face of the paper. Unless otherwise described, thicknesses of the individual layers are taken perpendicular to the plane of the associated layer, and are provided by way of example only and may be larger and/or smaller than those listed. Similarly, the number and position of the layers, as well as the materials listed herein, are provided by way of example only, and one skilled in the art will understand that other materials may be used and layers added, moved, or removed without straying from the spirit and scope of the present invention.

CPP GMR

Figure 7:
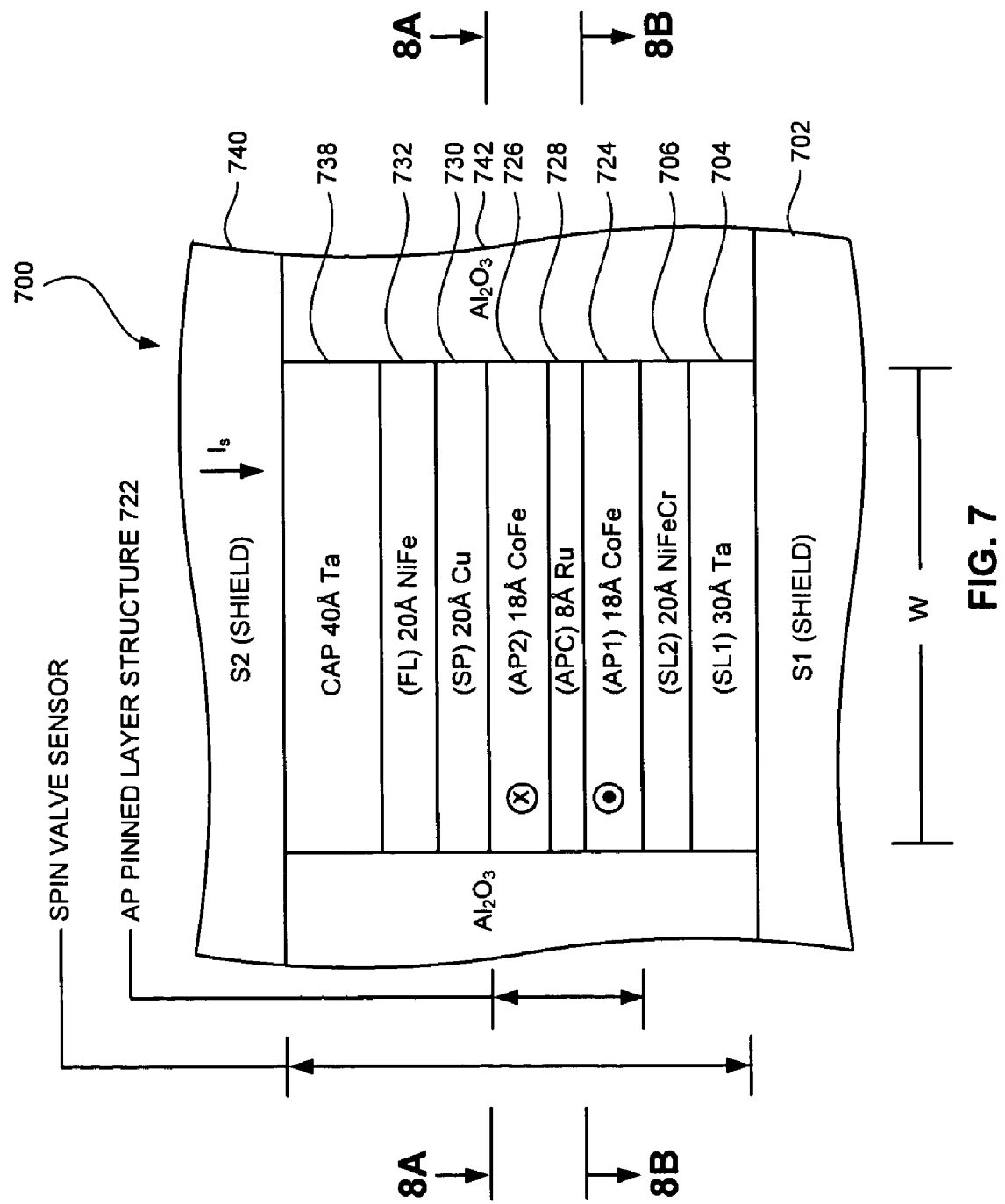
FIG. 7 is an ABS illustration of a CPP GMR sensor, not to scale, according to an embodiment of the present invention.

FIG. 7 depicts an ABS view of a simple CPP GMR sensor 700 according to one embodiment. "CPP" means that the sensing current ($I_s$) flows from one shield to the other shield in a direction perpendicular to the plane of the layers forming the sensor 700.

As shown in FIG. 7, a first shield layer (S1) 702 is formed on a substrate (not shown). The first shield layer 702 can be of any suitable material, such as permalloy (NiFe).

Seed layers are formed on the first shield layer 702. The seed layers aid in creating the proper growth structure of the layers above them. Illustrative materials formed in a stack from the first shield layer 702 are a layer of Ta (SL1) 704 and a layer of NiFeCr (SL2) 706. Illustrative thicknesses of these materials are Ta (30 Å), NiFeCr (20 Å). Note that the stack of seed layers can be varied, and layers may be added and/or omitted based on the desired processing parameters.

An antiparallel (AP) pinned layer structure 722 is formed above the seed layers 704, 706. As shown in FIG. 7, first and second AP pinned magnetic layers, (AP1) and (AP2) 724, 726, are separated by a thin layer of an antiparallel coupling (APC) material 728 such that the magnetic moments of the AP pinned layers 724, 726 are self-pinned antiparallel to each other. The pinned layers 724, 726 have a property known as magnetostriction. The magnetostriction of the pinned layers 724, 726 is very positive. The sensor 700 is also under compressive stresses because of its geometry at the ABS, and the configuration of the layer is such that it produces very large compressive stress. The combination of positive magnetostriction and compressive stress causes the pinned layers 724, 726 to develop a magnetic anisotropy that is in a perpendicular direction to the track width. The magnetic coupling through the AP coupling material 728 causes the pinned layers 724, 726 to have antiparallel-oriented magnetizations.

In the embodiment shown in FIG. 7, a preferred magnetic orientation of the pinned layers 724, 726 is for the first pinned layer 724, into the face of the structure depicted (perpendicular to the ABS of the sensor 700), and out of the face for the second pinned layer 726. Illustrative materials for the pinned layers 722, 726 are $CoFe_{10}$ (90% Co, 10% Fe), $CoFe_{50}$ (50% Co, 50% Fe), etc. separated by a Ru layer 724. Illustrative thicknesses of the first and second pinned layers 722, 726 are between about 10 Å and 25 Å. The Ru layer 724 can be about 5–15 Å, but is preferably selected to provide a saturation fields above about 10 KOe. In a preferred embodiment, each of the pinned layers 722, 726 is about 18 Å with an Ru layer 724 therebetween of about 8 Å.

In typical heads, the AP pinned layer structure 722 is stabilized by placement of an antiferromagnetic (AFM) layer above the pinned layer structure 722. The AFM layer pins the AP pinned layer structure 722 so that the pinned layers 724, 726 do not move around when disk is reading data from disk, upon application of external magnetic fields, etc. However, as mentioned above, AFM layers are very thick, typically about 150–200 Å. If the designer wants to fit the sensor into a small gap, use of thick AFM layers is not practical. However, as mentioned above, without a stabilizing layer, the AP-pinned layers 724, 726 are more likely to "flip" or reverse orientation upon application of a stress thereto. In particular, when a stress event occurs, such as when the head hits a disk defect, the anisotropy from compressive stress becomes very small, as mentioned above. At the moment that the anisotropy becomes very small (when the head hits the defect), the orientations of the pinned layers 724, 726 want to change, and can flip.

The present invention provides a solution to the problem of magnetization flip in "self-pinned" AP-pinned layers, i.e., layers that do not rely on an AFM or other stabilizing layer for stabilization. Aside from the magnetostriction- and stress-induced anisotropy, the AP-pinned layers 724, 726 have an intrinsic anisotropy (e.g., 50–100 Oe depending on the material) that is independent of stress (the intrinsic anisotropy is not changed by interaction of the head with the defect in the previous example). In the present invention, the magnetic easy axes (intrinsic) of the AP-pinned layers 724, 726 are purposefully oriented at some angle from the perpendicular. The angled easy axis is referred to herein as a "canted" easy axis.

Figure 8A:
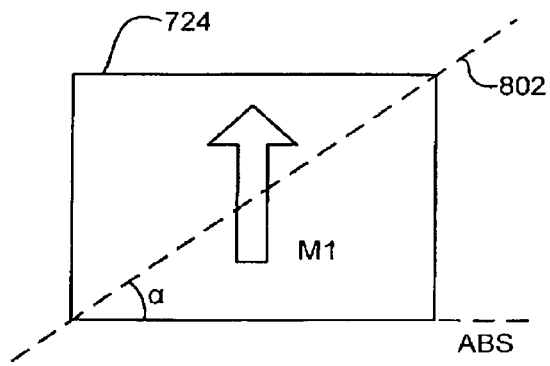
FIG. 8A is a partial top down view of the sensor shown in FIG. 7 taken along line 8A—8A of FIG. 7.
Figure 8B:
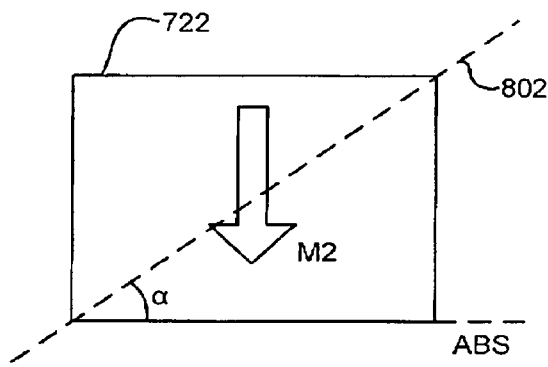
FIG. 8B is a partial top down view of the sensor shown in FIG. 7 taken along line 8B—8B of FIG. 7.
Figure 8C:
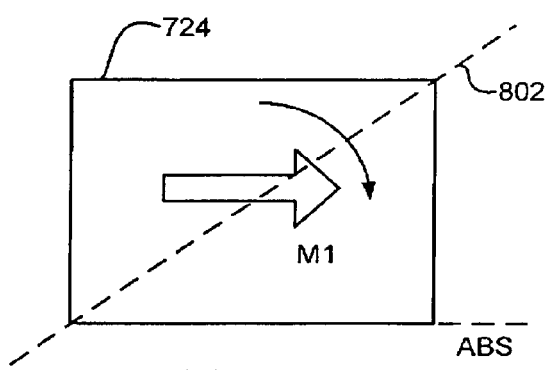
FIG. 8C is a partial top down view of the sensor shown in FIG. 8A.
Figure 8D:
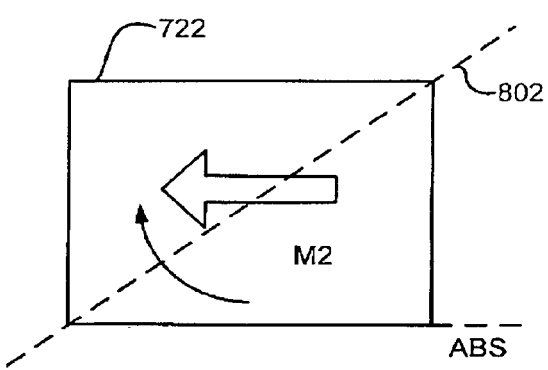
FIG. 8D is a partial top down view of the sensor shown in FIG. 8B.
Figure 8E:
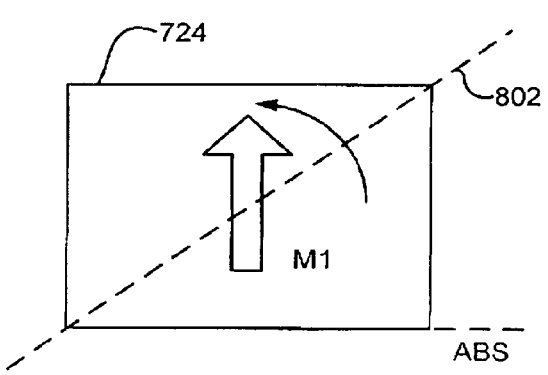
FIG. 8E is a partial top down view of the sensor shown in FIG. 8C.
Figure 8F:
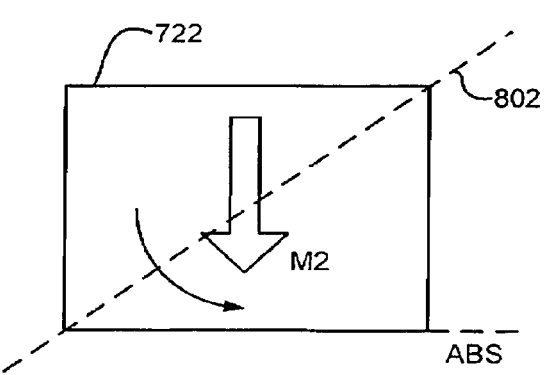
FIG. 8F is a partial top down view of the sensor shown in FIG. 8D.

FIGS. 8A and 8B illustrate the orientation of the canted easy axis 802 and the magnetic orientations (M1, M2) of the pinned layers 724, 726 in a normal state, i.e., no significant external stresses are present. The induced magnetic orientation of the pinned layers 724, 726 due to magnetostriction and compressive stress is oriented perpendicular to the ABS. Because the easy axis 802 is canted, the intrinsic anisotropy controls the direction in which the magnetization will rotate. If the intrinsic anisotropy were perpendicular to the ABS, the magnetization could rotate clockwise or counterclockwise. In the present invention, the easy axis 802 is canted, so upon application of an external stress, the magnetic orientations of the pinned layers 724, 726 will always rotate towards the canted easy axis 802 and become horizontal (parallel to the ABS), as shown in FIGS. 8C and 8D. As shown in FIGS. 8E and 8F, as soon as the stress is relieved (the head passes away from the defect in the prior example), the anisotropy from intrinsic stress takes over and the magnetic moments of the AP-pinned layers 724, 726 want to rotate back towards the easy axis 802, causing them to return to the desired perpendicular orientation.

The easy axis 802 is preferably oriented at an angle ($\alpha$) of about 5° or more from the ABS along a plane of the particular layer, and more preferably at an angle of between about 30° and about 60° from the ABS. Ideally, the easy axis 802 is oriented at an angle of between about 40° and about 50° from the ABS. This central orientation of the easy axis 802 between parallel and perpendicular to the ABS provides the greatest control over the pivoting of the magnetizations of the AP-pinned layers 724, 726 upon application of an external stress.

To cant the easy axes 802 to the desired orientation, the layers are deposited in the presence of a magnetic field as the sensor 700 is formed. The easy axes 802 will take the direction of the applied magnetic field. By rotating the magnetic field in the plane of the wafer (or rotating the wafer in the magnetic field), the easy axes 802 can be directed to whatever orientation is desired. The orientations of the easy axes 802 can be about the same, or can be different. By applying the magnetic field at a first angle during formation of a first-formed, and applying the magnetic field at a second angle during formation of the second-formed AP-pinned layer, the easy axes 802 will have different orientations. Thus, the head 700 can be fine tuned to accommodate various operating parameters, AP-pinned layers of different thicknesses, etc.

A spacer layer (SP) 730 is formed above the AP pinned layer structure 722. The spacer layer 730 is preferably formed of Cu. An exemplary thickness of the spacer layer 730 is about 10–30 Å.

A free layer (FL) 732 is formed above the spacer layer 730. The magnetic moment of the free layer 732 is soft and so is susceptible to reorientation from external magnetic forces, such as those exerted by data on disk media. The relative motion of magnetic orientation of the free layer 732 when affected by data bits on disk media creates variations in the sensing current flowing through the sensor 700, thereby creating the signal. Illustrative materials for the free layer 732 are CoFe, NiFe, Fe, and laminates thereof. An illustrative thickness of the free layer 732 is about 10–40 Å.

The magnetic orientation of the free layer 732 must be preset during manufacture, otherwise the orientation will be unstable and could move around at random, resulting in a "scrambled" or noisy signal. This instability is a fundamental property of soft materials, making them susceptible to any external magnetic perturbations. Thus, the magnetic orientation of the free layer 732 should be stabilized so that when its magnetic orientation moves, it consistently moves around in a systematical manner rather than a random manner. The magnetic orientation of the free layer 732 should also be stabilized so that it is less susceptible to reorientation, i.e., reversing. Usually hard magnet layers (not shown) are placed adjacent to the edges of the free layer 732 to stabilize the free layer.

A cap layer (CAP) 738 is formed above the free layer 732. Exemplary materials for the cap layer 738 are Ta, Ta/Ru stack, etc. An illustrative thickness of the cap layer 738 is 20–40 Å.

A second shield layer (S2) 740 is formed above the cap 738. An insulative material 742 such as $Al_2O_3$ is formed on both sides of the sensor 700.

Figure 9:
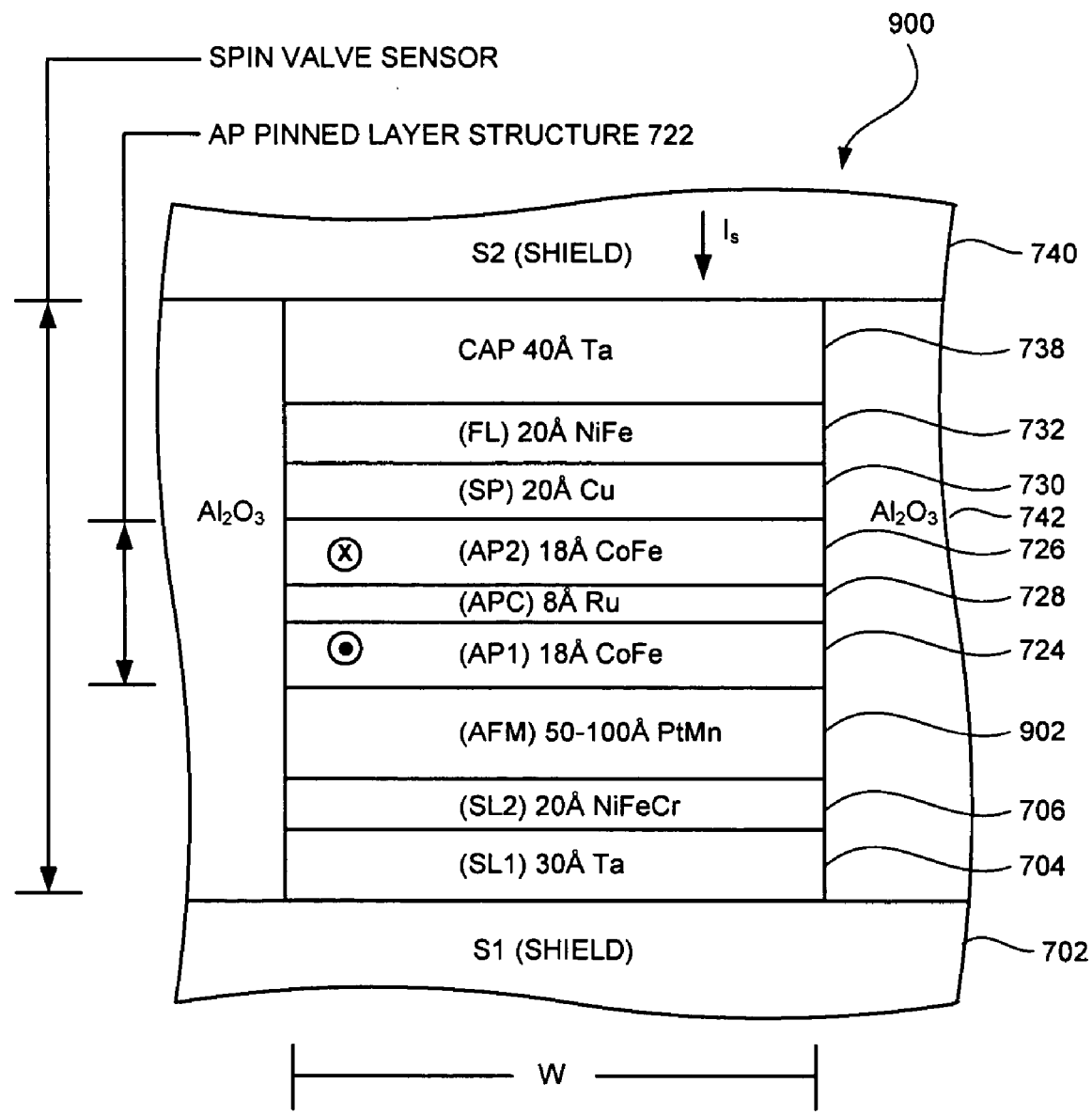
FIG. 9 is an ABS illustration of a CPP GMR sensor, not to scale, according to another embodiment of the present invention.

FIG. 9 illustrates an ABS view of a CPP GMR sensor 900 according to another embodiment. The CPP GMR sensor 900 generally has a similar configuration as the structure shown in FIG. 7, except that the structure now includes an AFM layer 902. Because the canted easy axis of the pinned layers prevents unwanted flipping, the AFM layer 902 does not need to be as thick. An illustrative thickness of the AFM layer 902 is 50–100 Å. In this embodiment, the easy axis is preferably set at an angle of about 5–45°, and more preferably about 10–30°, from the ABS.

CPP Tunnel Valve

Figure 10:
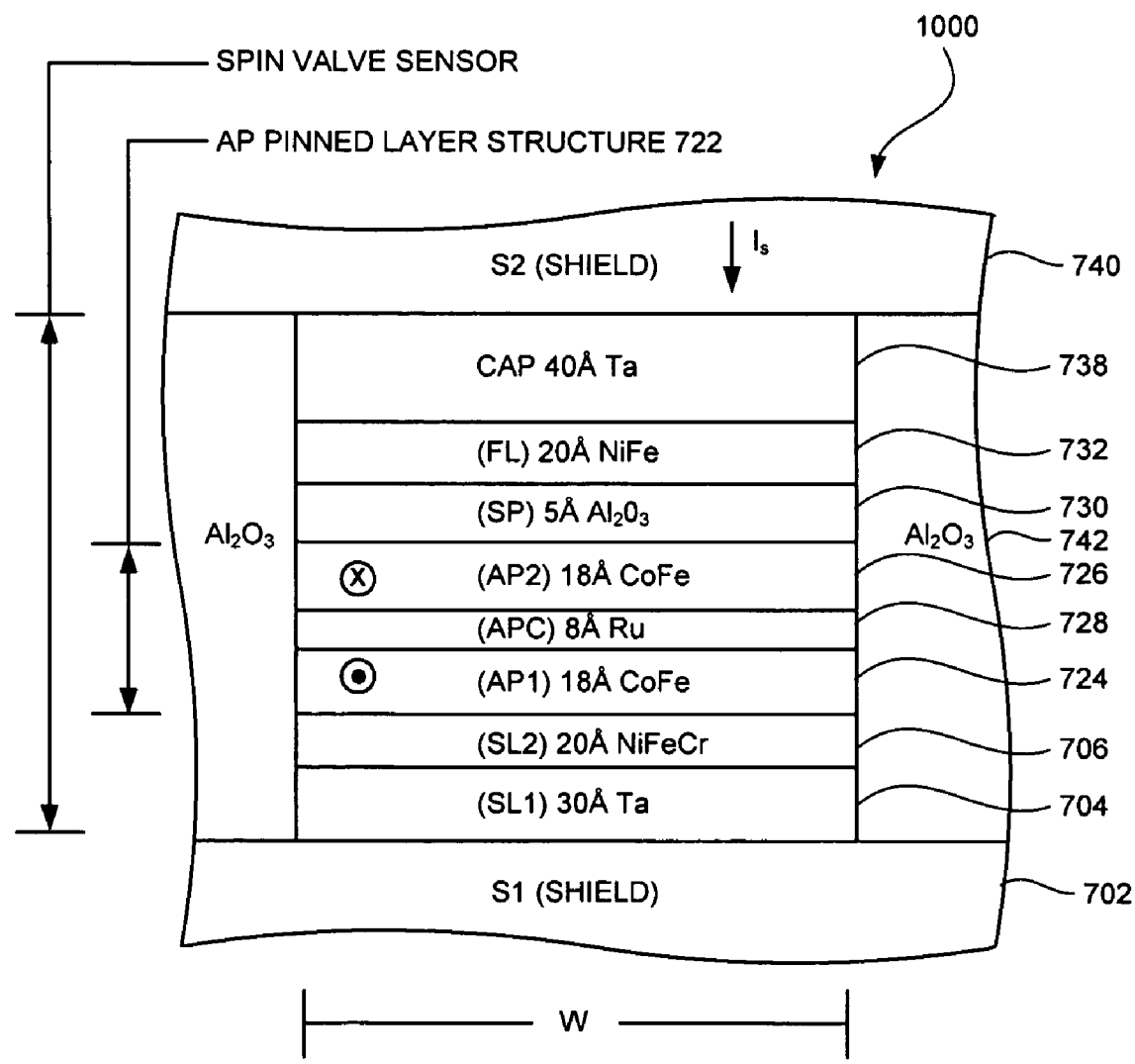
FIG. 10 is an ABS illustration of a CPP tunnel valve sensor, not to scale, according to an embodiment of the present invention.

FIG. 10 depicts an ABS view of a CPP tunnel valve sensor 1000 according to one embodiment. The CPP tunnel valve sensor 1000 generally has the same configuration as the structure shown in FIG. 7, except that the spacer layer 730 is formed of a dielectric barrier material, such as, $Al_2O_3$, $AlO_x$, $MgO_x$, etc. The spacer layer 730 is very thin such that the electric current passing through the sensor 1000 "tunnels" through the spacer layer 730. An illustrative thickness of the spacer layer 730 is 3–6 Å.

CIP GMR

Figure 11:
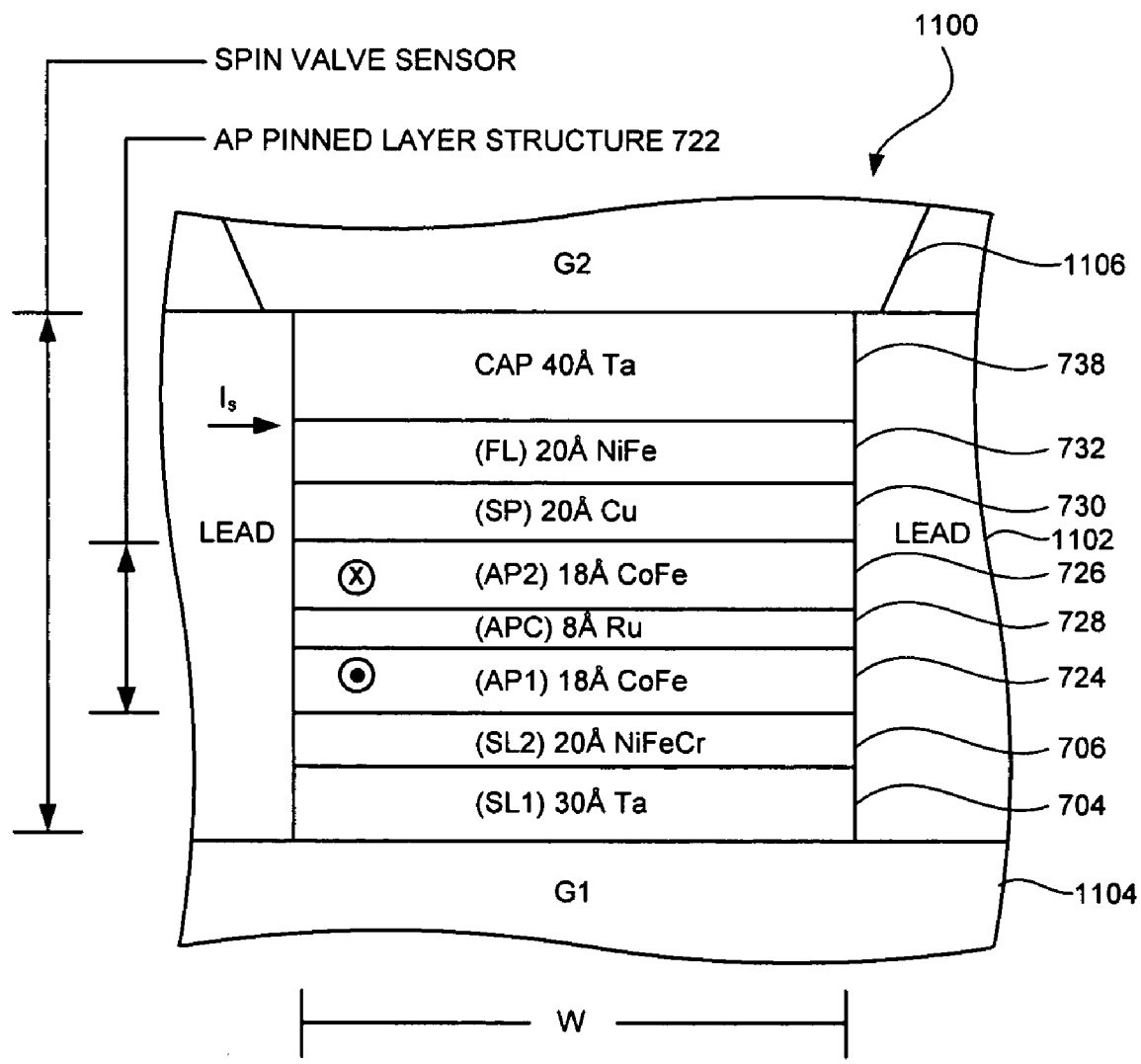
FIG. 11 is an ABS illustration of a CIP GMR sensor, not to scale, according to an embodiment of the present invention.

FIG. 11 depicts an ABS view of a CIP GMR sensor 1100 according to one embodiment. "CIP" means that the sensing current ($I_s$) flows from in a direction parallel to or "in" the plane of the layers forming the sensor 1100. The CIP GMR sensor 1100 generally has the same configuration as the structures shown in FIG. 7, except that leads 1102 of conventional materials and thicknesses are formed on opposite sides of the sensor 1100 and the sensor 1100 is sandwiched between an insulative material (G1), (G2) 1104, 1106. Another important difference is that current flows across the track width as opposed to perpendicular to the track width.

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A magnetic head having an air bearing surface (ABS), comprising:
    a free layer; and
    an antiparallel (AP) pinned layer structure spaced apart from the free layer, the AP pinned layer structure including at least two AP-pinned layers having magnetic moments that are self-pinned antiparallel to each other, the AP-pinned layers being separated by an AP coupling layer;
    wherein an easy axis of a first of the AP-pinned layers is oriented at an angle of at least 5° from the ABS along a plane of the first AP-pinned layer.

2. A head as recited in claim 1, wherein an easy axis of each of the AP-pinned layers is oriented at an angle of at least 5° from the ABS along a plane of the associated AP-pinned layer.

3. A head as recited in claim 1, wherein the easy axis of the first AP-pinned layers is oriented at an angle of between about 30° and about 60° from the ABS along a plane of the first AP-pinned layer.

4. A head as recited in claim 1, wherein the easy axis of the first AP-pinned layer is oriented at an angle of between about 40° and about 50° from the ABS along a plane of the first AP-pinned layer.

5. A head as recited in claim 1, wherein easy axes of the AP pinned layers are oriented at about the same angle.

6. A head as recited in claim 1, wherein easy axes of the AP pinned layers are oriented at different angles.

7. A head as recited in claim 1, wherein the easy axis is set by forming the first AP-pinned layer in the presence of an applied magnetic field having flux oriented at an angle of at least 5° from the ABS along the plane of the first AP-pinned layer.

8. A head as recited in claim 1, wherein the AP pinned layer structure is self pinned, the AP pinned layer structure not being stabilized by an antiferromagnet.

9. A head as recited in claim 1, wherein the magnetizations of the AP-pinned layers are oriented perpendicular to the ABS.

10. A head as recited in claim 1, further comprising an AFM layer.

11. A head as recited in claim 1, wherein the easy axis of the first AP-pinned layer is oriented at an angle of between about 5° and about 45° from the ABS along a plane of the first AP-pinned layer.

12. A head as recited in claim 1, wherein the head is a CPP GMR sensor.

13. A head as recited in claim 1, wherein the head is a CPP tunnel valve sensor.

14. A head as recited in claim 1, wherein the head is a CIP sensor.

15. A magnetic head having an air bearing surface (ABS), comprising:
   a free layer; and
   an antiparallel (AP) pinned layer structure spaced apart from the free layer, the AP pinned layer structure including at least two AP-pinned layers having magnetic moments that are self-pinned antiparallel to each other, the AP-pinned layers being separated by an AP coupling layer;
   wherein the easy axes of the AP-pinned layers are oriented at an angle of between about 30° and about 60° from the ABS along a plane of the associated AP-pinned layer.

16. A head as recited in claim 15, wherein the easy axis of each of the AP-pinned layers is oriented at an angle of between about 40° and about 50° from the ABS along a plane of the associated AP-pinned layer.

17. A head as recited in claim 15, wherein the angle of each of the easy axes is about the same.

18. A head as recited in claim 15, wherein the angles of the easy axes are different.

19. A head as recited in claim 15, wherein the easy axis is set by forming the AP-pinned layers in the presence of an applied magnetic field having flux oriented at an angle of between about 30° and about 60° from the ABS along the plane of the first AP-pinned layer.

20. A head as recited in claim 15, wherein the AP pinned layer structure is self pinned, the AP pinned layer structure not being stabilized by an antiferromagnet.

21. A head as recited in claim 15, wherein the magnetizations of the AP-pinned layers are oriented perpendicular to the ABS.

22. A head as recited in claim 15, further comprising an AFM layer.

23. A head as recited in claim 22, wherein the easy axis of the first AP-pinned layer is oriented at an angle of between about 5° and about 45° from the ABS along a plane of the first AP-pinned layer.

24. A head as recited in claim 15, wherein the head is a CPP GMR sensor.

25. A head as recited in claim 15, wherein the head is a CPP tunnel valve sensor.

26. A head as recited in claim 15, wherein the head is a CIP sensor.

27. A magnetic storage system, comprising:
   magnetic media;
   at least one head for reading from and writing to the magnetic media, each head having:
      a free layer; and
      an antiparallel (AP) pinned layer structure spaced apart from the free layer, the AP pinned layer structure including at least two AP-pinned layers having magnetic moments that are self-pinned antiparallel to each other, the AP-pinned layers being separated by an AP coupling layer;
      wherein an easy axis of a first of the AP-pinned layers is oriented at an angle of at least 5° from the ABS along a plane of the first AP-pinned layer;
   a slider for supporting the head; and
   a control unit coupled to the head for controlling operation of the head.

* * * * *